No. 663,200. Patented Dec. 4, 1900.
DE WANE B. SMITH.
SPRAYER.
(Application filed Aug. 24, 1898.)
(No Model.)
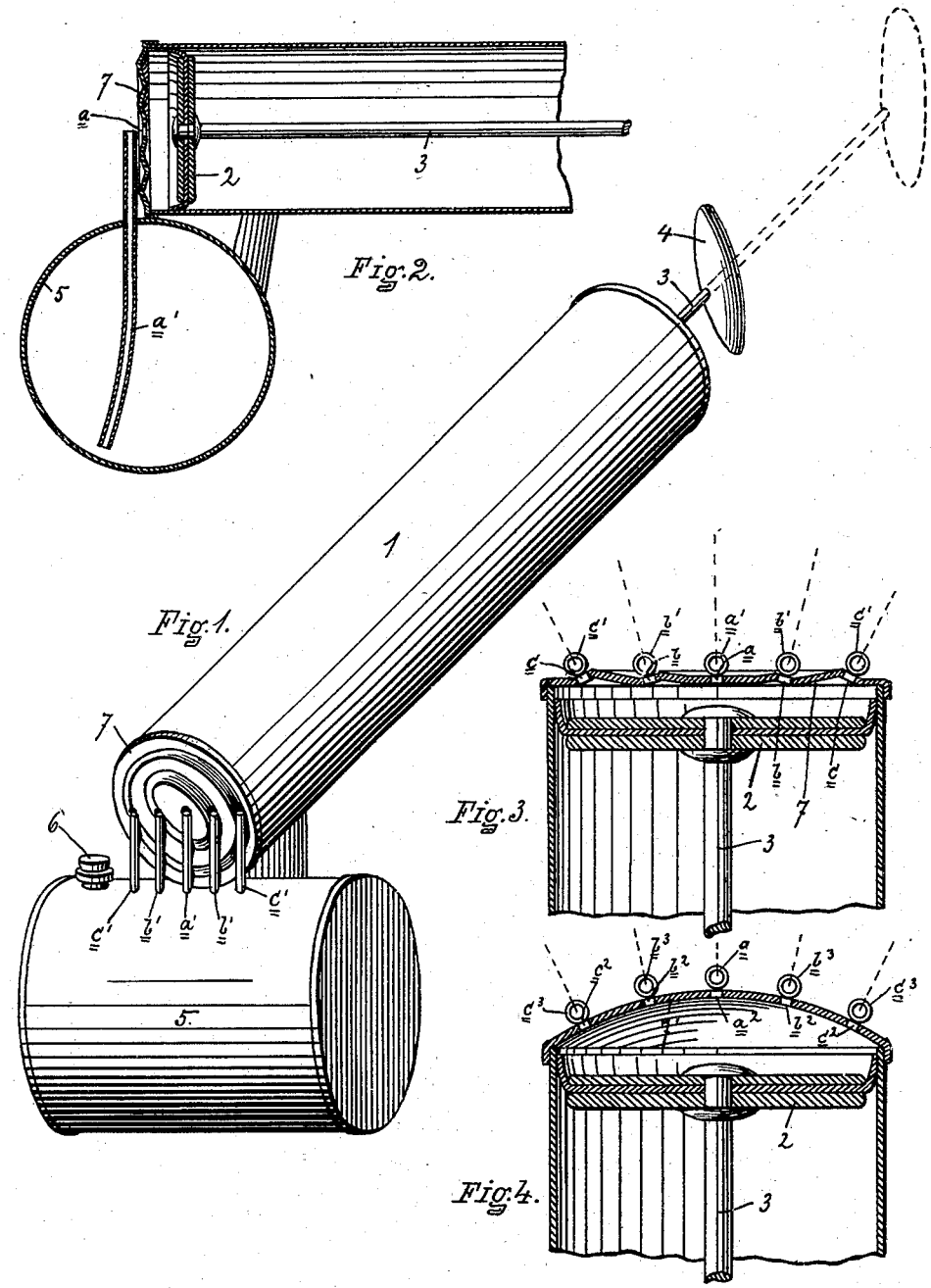
WITNESSES
Rich. A. George.
Era M. Chase.
INVENTOR
DE WANE B. SMITH
By Milton E. Robinson
ATTORNEY.

UNITED STATES PATENT OFFICE.

DE WANE B. SMITH, OF DEERFIELD, NEW YORK.

SPRAYER.

SPECIFICATION forming part of Letters Patent No. 663,200, dated December 4, 1900.

Application filed August 24, 1898. Serial No. 689,401. (No model.)

*To all whom it may concern:*

Be it known that I, DE WANE B. SMITH, of Deerfield, in the county of Oneida and State of New York, have invented certain new and useful Improvements in Sprayers; and I do hereby declare that the following is a full, clear, and exact description of the invention, which will enable others skilled in the art to which it appertains to make and use the same, reference being had to the accompanying drawings, and to the characters of reference marked thereon, which form part of this specification.

My present invention relates to improvements in sprayers; and the object of the invention is to provide a sprayer which effectually atomizes, distributes, and directs the spray and provides an instrument of sufficient capacity and effectiveness for practical use by agriculturists and dairymen and others having use for such a device.

The nature of the invention will appear in detail by the following specification and claim.

In the drawings, Figure 1 shows a perspective view of my improved sprayer. Fig. 2 shows a partial vertical section of the same. Fig. 3 shows a partial horizontal section. Fig. 4 shows a similar section to Fig. 3 of a modified form of construction.

Referring to the reference letters and figures in a more particular description, 1 indicates the sprayer barrel or cylinder, which receives the piston-head 2, mounted on the inner end of the piston-rod 3, which rod is provided on the outer end with a handle 4. Secured at one end of the cylinder 1 is a fluid-receptacle 5, provided with an opening 6, at which it may be filled. On the end of the cylinder 1 adjacent to the receptacle 5 is provided a cylinder-head 7. The cylinder-head 7, as shown in Figs. 1, 2, and 3, is provided with circular corrugations. In the head 7 there are provided air-discharge openings $a$, $b\,b$, $c\,c$. The opening $a$ is arranged to discharge a blast from the cylinder, in line with the axis of the cylinder, as indicated by the dotted line emanating from this opening, as shown in Fig. 3. The openings $b\,b$ are arranged in the edge of the corrugations of the head, so as to direct the air-blasts issuing therefrom at an acute angle with the axis of the barrel, as indicated by the dotted lines emanating from these openings, as shown in Fig. 3. The openings $c\,c$ are arranged in the edge of the corrugations of the head 7 at a greater angle from the axis of the cylinder, so as to direct the air-blasts issuing therefrom, as indicated by the dotted lines emanating from these openings, as shown in Fig. 3. It will be noted by reference to Fig. 1 that the several openings $a$, $b\,b$, and $c\,c$ are arranged in the same horizontal line across the head of the cylinder. From points approximate to the air-discharge openings $a$, $b\,b$, and $c\,c$ extend a series of suction-tubes $a'$, $b'\,b'$, and $c'\,c'$ down into the fluid-receptacle 5 and to a point adjacent to the bottom thereof, as shown.

In the modified form of construction shown in Fig. 4 in lieu of the corrugated head 7 there is provided a curved or rounded head $7'$, in which are arranged the air-discharge openings $a^2$, $b^2\,b^2$, and $c^2\,c^2$, all arranged to direct their blasts in diverging directions, similar to the construction shown in Fig. 3 and as indicated by the dotted lines emanating from the openings in Fig. 4. Similar suction-tubes $a^3$, $b^3\,b^3$, and $c^3\,c^3$ are provided in connection with this form of cylinder-head, extending into a suitable receptacle, as shown in the other construction.

In operation the receptacle 5 is filled with a suitable liquid containing poisons for certain uses and medicated for certain other uses, as occasion may require. The device is then operated by drawing back the plunger by means of the handle 4, as indicated in dotted lines in Fig. 1, and then forcing it toward the head of the cylinder, forcibly expelling the air in divergent blasts from the openings in the head of the cylinder and across the top of the suction-tubes. The air-blast causes the fluids in the receptacle to rise in the tube and pass out of the upper end thereof, and when caught by the air-blast the fluid is atomized. The sprayer as a whole, by reason of the divergency of the openings, is delivered over a wide horizontal space and a comparatively narrow vertical space and in the most effective manner for ordinary use. The internal opening of the suction-tubes is comparatively small, so that only a limited quantity of fluid passes, which is effectively atomized and not delivered in globules or drops.

One or more of the air-discharge openings may be temporarily stopped or plugged and the spray or the manner in which it is delivered thereby modified to adapt it to various uses.

What I claim as new, and desire to secure by Letters Patent, is—

In a sprayer, a barrel having a curved or corrugated head having a series of blow-holes arranged directly in the curve or corrugations of the head to deliver blasts of air in divergent directions, a plunger in said barrel, a fluid-receptacle and a suction-tube for each blow-hole extending from a point approximate to the blow-hole into the receptacle, combined, substantially as set forth.

In witness whereof I have affixed my signature, in presence of two witnesses, this 18th day of August, 1898.

DE WANE B. SMITH.

Witnesses:
SARAH A. BROWN,
E. WILLARD JONES.